United States Patent
Heinrich

(10) Patent No.: US 8,012,618 B2
(45) Date of Patent: Sep. 6, 2011

(54) RECHARGEABLE BATTERY AND BATTERY PACK

(75) Inventor: Thomas Heinrich, Leinfelden (DE)

(73) Assignee: Robert Bosch GmbH, Stuttgart (DE)

( * ) Notice: Subject to any disclaimer, the term of this patent is extended or adjusted under 35 U.S.C. 154(b) by 83 days.

(21) Appl. No.: 12/166,388

(22) Filed: Jul. 2, 2008

(65) Prior Publication Data

US 2009/0011324 A1    Jan. 8, 2009

(30) Foreign Application Priority Data

Jul. 6, 2007    (DE) .................. 10 2007 031 558

(51) Int. Cl.
 *H01M 10/50* (2006.01)
(52) U.S. Cl. ............................. 429/62; 429/61; 429/90
(58) Field of Classification Search .......... 429/122–347, 429/61, 62, 90; 29/623.1–623.5
See application file for complete search history.

(56) References Cited

U.S. PATENT DOCUMENTS

| 4,255,698 A | * | 3/1981 | Simon ........................ 320/134 |
| 6,114,942 A | * | 9/2000 | Kitamoto et al. ......... 338/22 R |
| 6,152,597 A | * | 11/2000 | Potega ....................... 374/185 |
| 6,479,185 B1 | | 11/2002 | Hilderbrand et al. |
| 2005/0206494 A1 | * | 9/2005 | Ko et al. .................... 338/22 R |

FOREIGN PATENT DOCUMENTS

| DE | 33 40 882 C1 | 6/1985 |
| JP | 10-270094 A | 10/1998 |
| KR | 2001-0071112 A | 7/2001 |
| WO | WO 99/51956 A1 | 10/1999 |

* cited by examiner

*Primary Examiner* — Basia Ridley
*Assistant Examiner* — Jonathan G Leong
(74) *Attorney, Agent, or Firm* — Ronald E. Greigg

(57) ABSTRACT

Known rechargeable batteries contain a cell that is received in a cell cup. For monitoring the temperature of the rechargeable batteries, PTC elements are used, but they increase the amount of space needed and can be accommodated in a battery pack only with difficulty. For the sake of simple accommodation, a rechargeable battery has a cell, which is received in a cell cup. According to the invention, for monitoring the temperature of the cell, a temperature-dependent element, in particular a PTC element, is provided that at least partially surrounds the cell cup. The invention is intended in particular for battery packs in which temperature monitoring is required.

11 Claims, 3 Drawing Sheets

RECHARGEABLE BATTERY AND BATTERY PACK

CROSS-REFERENCE TO RELATED APPLICATIONS

This application is based on German Patent Application No. 10 2007 031 558.0 filed on Jul. 6, 2007, upon which priority is claimed.

BACKGROUND OF THE INVENTION

1. Field of the Invention

The present invention relates to a rechargeable battery containing a cell that is received in a cell cup, and to a battery pack containing at least a single rechargeable battery.

2. Description of the Prior Art

Rechargeable batteries and battery packs are discharged and charged, and a charger has to be provided for charging them. It is important, not only during the charging operation, but especially during discharging, to monitor the temperature of the rechargeable batteries, in order to prevent an overly high temperature rise or an excessive temperature during the discharging process. For this purpose, cold conductors known as PTC elements are used, which increase the resistance as the temperature increases. At low temperatures, the resistance is low, and good conduction of the current is effected. The PTC element is connected in series with the other batteries in the battery pack. Accommodating the PTC element in the battery itself or in the battery pack is often difficult, because space is tight in the battery packs. Complicated wiring is also necessary, for conducting the PTC element to the battery or cell.

OBJECT AND SUMMARY OF THE INVENTION

The rechargeable battery and battery pack according to the invention have the advantage over the prior art that the temperature-dependent element, in particular the PTC element, can be mounted directly on the rechargeable battery or its cell, without complicated wiring or insulation or mechanical retention, and can be connected to the other rechargeable batteries. It is highly advantageous in this respect that essentially no additional installation space for the temperature-dependent element is required on the rechargeable battery or inside the housing of the battery pack. Furthermore, excellent thermal coupling of the temperature-dependent element to the rechargeable battery or cell is achieved, and the volume used for the temperature-dependent element is extremely small. This advantageously makes it possible to accomplish temperature monitoring of the batteries in the battery pack by simply replacing a conventional rechargeable battery with the rechargeable battery of the invention, without having to alter the housing of the battery pack structurally for the purpose.

For good heat-conducting coupling of the temperature-dependent element to the cell cup, it is advantageous that the temperature-dependent element surrounds the cell cup in an arbitrary way, preferably approximately halfway. It is equally possible that the temperature-dependent element surrounds the cell cup completely, in the form of a sleeve.

Advantageously, simple charging temperature monitoring and discharging temperature monitoring of the rechargeable battery can be accomplished in that the temperature-dependent element is connected electrically to the cell cup for which purpose a series circuit of the temperature-dependent element and the cell is effected.

It is advantageous, for compact production of the electrical connection of the temperature-dependent element and the cell cup or cell, without complicated wiring, to solder and/or weld and/or glue a first metal layer of the temperature-dependent element, and the first metal layer is adjoined by an intermediate layer having the temperature-dependent properties, in particular cold conductor properties, which is covered by a second metal layer of the temperature-dependent element.

An advantageous compact design is obtained, and for insulation purposes, an insulation layer is provided at least partially between the first metal layer and the second metal layer of the temperature-dependent element.

It is furthermore advantageous, for insulation purposes, an insulation layer to be provided between the second metal layer and the cell cup. This makes it possible in a quite simple way, via a cell connector connected to the second layer, to establish an electrical connection with the other batteries in a battery pack.

For simple production, it is advantageous to make the insulation layer from a foil or film.

Advantageously, a simple, safe and reliable connection of the rechargeable battery of the invention to at least one further, conventional rechargeable battery of the battery pack is brought about by providing a cell connector that has an angled shape. This makes it possible to maintain installation spaces, unchanged, for the rechargeable batteries and the battery pack. It is thus highly advantageously possible, by simply replacing a single conventional rechargeable battery with the rechargeable battery of the invention, to furnish temperature monitoring for the battery pack.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

A rechargeable battery, also known as an accumulator or secondary cell, is a storage means for electrical energy, usually on the basis of an electrochemical system. Examples of known systems are nickel-cadmium, nickel-metal hydride, lithium-ion, or lithium-polymer batteries, which contain a galvanic cell that after discharging can be recharged. For achieving a defined voltage, these cells are packed and connected to one another to make a battery pack. The individual cells are all of the same type. The desired voltage or rated voltage of the battery pack is the sum of the series-connected cells.

Figure 1:
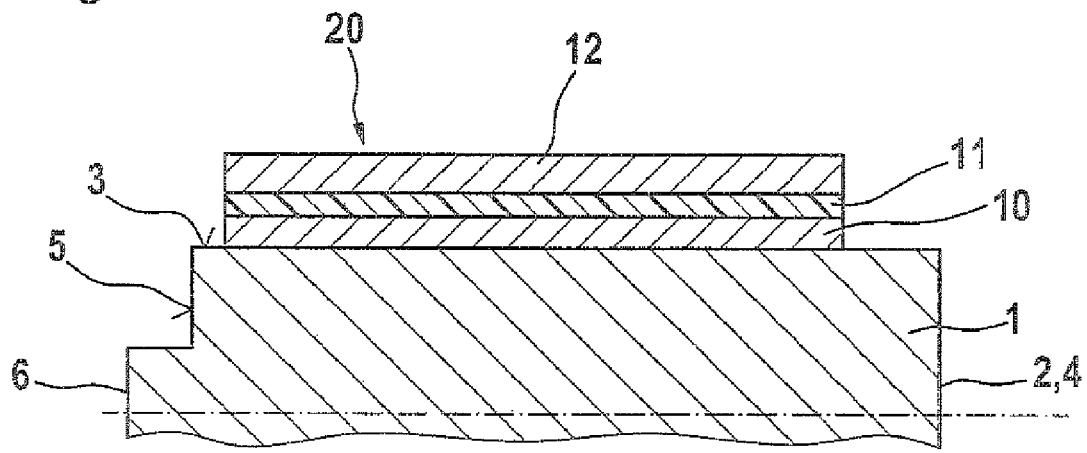
FIG. 1, for illustrating the various layers of a PTC element, shows a schematically simplified sectional view of a side view of a rechargeable battery according to the invention with a PTC element.

Each rechargeable battery includes a galvanic cell 1, schematically shown in FIG. 1, which is surrounded in a known manner by a cell cup 2. The cell 1 has an elongated cylindrical shape, with a jacket face 3 and two bases. A first flat base 4 typically forms the negative pole. A second base 5, diametrically opposite the first base 4, likewise has a flat side, which forms the positive pole 6 of the cell 1.

Figure 6:
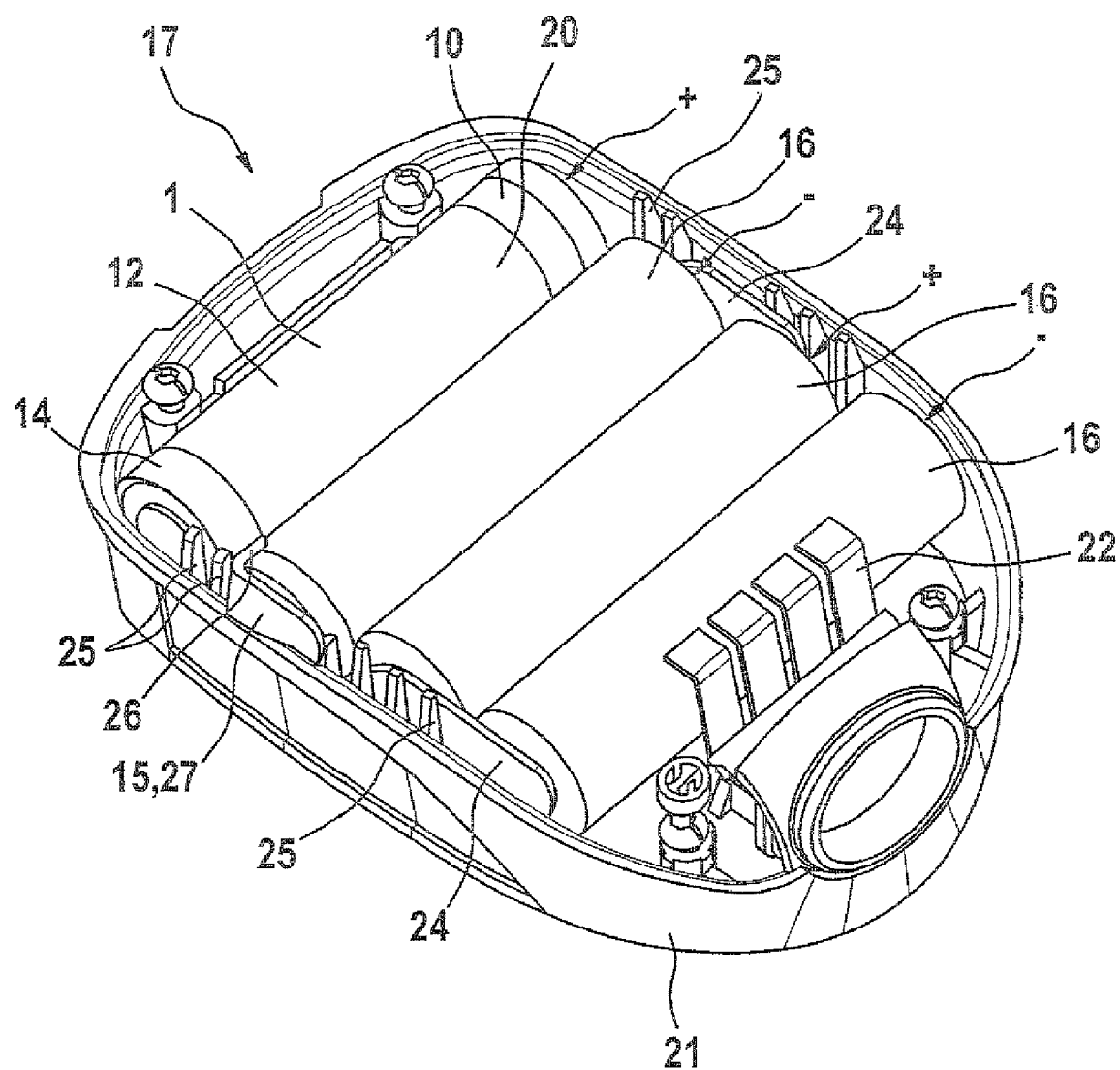
FIG. 6, in a perspective view, shows the battery pack of the invention with the installed single rechargeable battery of FIG. 2 or FIG. 3.

For connecting the individual cells or connecting them in series, cell connectors 24 show in FIG. 6 are provided between the negative pole of a first cell 16 and the adjoining positive pole of the next, adjacent cell 16.

Battery packs comprising at least one and up to ten cells, depending on the desired voltage, are typical. In the exemplary embodiment of FIG. 6, four cells 1, 16 are connected together to make a battery pack 17, as is typical for instance for using electric power tools (the cell sizes are for instance Baby, Mono, AA, AAA, 4/5 Sub-C cell, Sub-C cell, 18650 cell, 26650 cell, or the like).

For temperature monitoring, at least one of the cells 1 is provided with a temperature-dependent element 20. By means of this element 20, a shutoff can then be effected upon discharging and/or charging. If the temperature-dependent element 20 is a PTC resistor, a "hard" shutoff of the current takes place. The PTC resistor or PTC element (PTC=positive temperature coefficient) is a so-called cold conductor. Such cold conductors comprise a material that conducts the electric current and that conducts the current better at lower temperatures than at high temperatures. Its electrical resistance increases as the temperature rises. This special type of resistors thus has a positive temperature coefficient. Such PTC resistors have a steep increase in the resistance and are therefore generally not suitable for regulating current and voltage. The PTC resistor is therefore provided for shutoff upon discharging and charging of the batteries and cells.

An NTC resistor can be installed in each battery or battery pack as well. The resistance is read out by the charger. An NTC resistor is a hot conductor with a negative temperature coefficient (NTC). Its electrical resistance decreases as the temperature rises.

The term battery pack 17 is understood here conventionally to mean a number of rechargeable batteries that are arranged together in a common housing 21, optionally with further circuit elements as well. Via a plug strip or a plurality of contact elements 22 on the housing 21 of the battery pack 17, the connection of the battery pack 17 is then effected. To protect such rechargeable batteries especially against excessive discharge and overcharging, it is known to provide the temperature-dependent element 20 in the battery pack 17, in the immediate vicinity of or in direct contact with a rechargeable battery 1; the characteristic curve of the temperature-dependent element 20 is then monitored or measured during discharging and charging, in order to avoid excessive heating of the rechargeable batteries 1, 16.

According to the invention, it is now provided, for temperature monitoring especially during the discharging process of the cell 1, to equip the cell with the temperature-dependent element 20, without substantially altering the structural size. It is provided that the temperature-dependent element be embodied as a PTC element 20, which as shown in FIGS. 1 through 4 arbitrarily surrounds the cell cup 2, at least partially directly or directly. Between the cell 1 and the PTC 20, a series circuit is made. If the cell 1 heats up, the resistance increases, so that the current drawn is for instance reduced in a controlled way, for instance, so as to avoid an excessive temperature of the cell 1.

Figure 2:
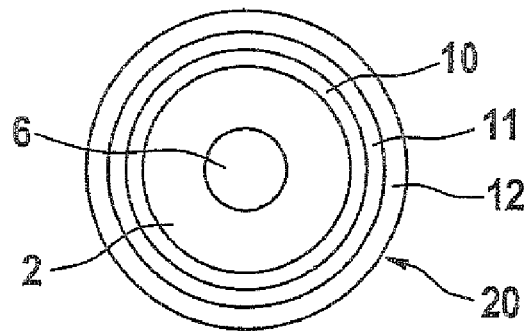
FIG. 2 is a cross section, not to scale, through the rechargeable battery with the PTC element in a first exemplary embodiment of the invention.
Figure 3:
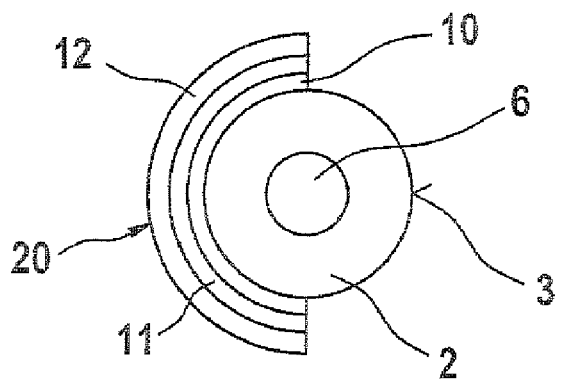
FIG. 3 is a cross section, not to scale, through the rechargeable battery with the PTC element in a second exemplary embodiment of the invention.

A PTC normally comprises two metal plates, between which is a layer of plastic having the special properties of the PTC. The usual embodiment is a flat structural shape. According to the invention, a departure from that structural shape is now made, and a round or half-round form of the PTC element 20 is provided, which as schematically indicated in FIG. 1 at least partially surrounds the cell cup 2. FIG. 2 shows a first exemplary embodiment with a PTC element that circumferentially surrounds the cell 1 and cell cup 2 completely (360°). The PTC element 20 thus forms an envelope or sleeve for the cell cup 2. FIG. 3 shows a second exemplary embodiment, with a PTC element 20 that only partly surrounds the cell cup 2; an approximately 180° surround (half-round) has been attained. A somewhat lesser surround of less than 180°, such as 100°, would also be conceivable. The degree of surrounding must not be too slight, however, because otherwise good thermal coupling of the PTC element 20 and the cell cup 2 for the temperature monitoring would be at risk. Care must also be taken that with an increasing flow of current in the cell 1, the requisite surface area of the PTC element 20 must also be greater.

The embodiment of the various layers of the PTC element 20 is done in such a way that a first metal layer 10 is connected electrically to the cell cup 2 or the jacket face 3 of the cell cup 2 by means of soldering, welding, gluing, or the like. It is understood to be conceivable to combine these methods, such as gluing and soldering. It is preferably provided that the first layer 10 is welded to the cell cup 2 or the jacket face 3.

The first layer 10 is adjoined radially outward by a plastic intermediate layer 11, which has the typical PTC cold conductor properties and for that purpose comprises a polymer material, for instance. The intermediate layer 11 is surrounded by a second layer 12, which, like the first layer 10, is of metal. The second metal layer 12 thus forms the new negative pole of the cell 1. The first layer 10, the intermediate layer 11 and the second layer 12 form the temperature-dependent electrical element 20 or PTC 20. By means of this construction, a series circuit of the cell 1 and PTC 20 is attained. In the longitudinal direction of the cell 1, the first layer 10 extends into the vicinity of the positive pole 6. The intermediate layer 11 then follows, somewhat shorter and farther away from the positive pole 6, and is covered essentially without offset by the second layer 12. Thus the PTC element 20 is very well coupled thermally to the cell 1, and the volume used for the PTC element 20 is only minimal, especially in comparison with a flat embodiment of the PTC element that would then require additional space in the battery pack 17. The layers 10, 11, 12 shown in FIGS. 1 through 4 are depicted as exaggerated and in reality are much thinner.

Figure 4:
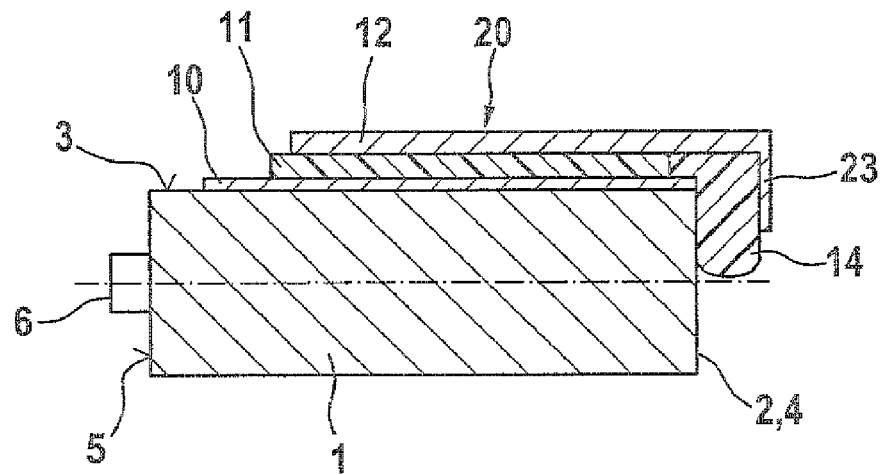
FIG. 4, in a sectional view not to scale, shows a side view of the rechargeable battery with the PTC element, embodied in accordance with the first or second exemplary embodiment.

FIG. 4 shows a more-precise embodiment of the cell 1 with the PTC element 20 for connection to other cells 16 without a PTC element. As in FIG. 1 the PTC element 20 has three layers 10, 11, 12. In a modification of FIG. 1, the second layer 12, spaced apart from the first base 4, now covers not only the jacket face 3 but radially at least partially covers the first base 4 of the cell 1, which forms the former negative pole. This additional embodiment of the second layer 12 is indicated by reference numeral 23 in FIG. 4. For insulating the former negative pole from the new negative pole 23 formed by the PTC element 20, an insulation layer 14 is provided. The insulation layer 14 may comprise a film or foil, for instance, and besides radially covering the first base 4 may also cover the jacket face 3 somewhat, as viewed in the longitudinal direction of the cell 1.

Figure 5:
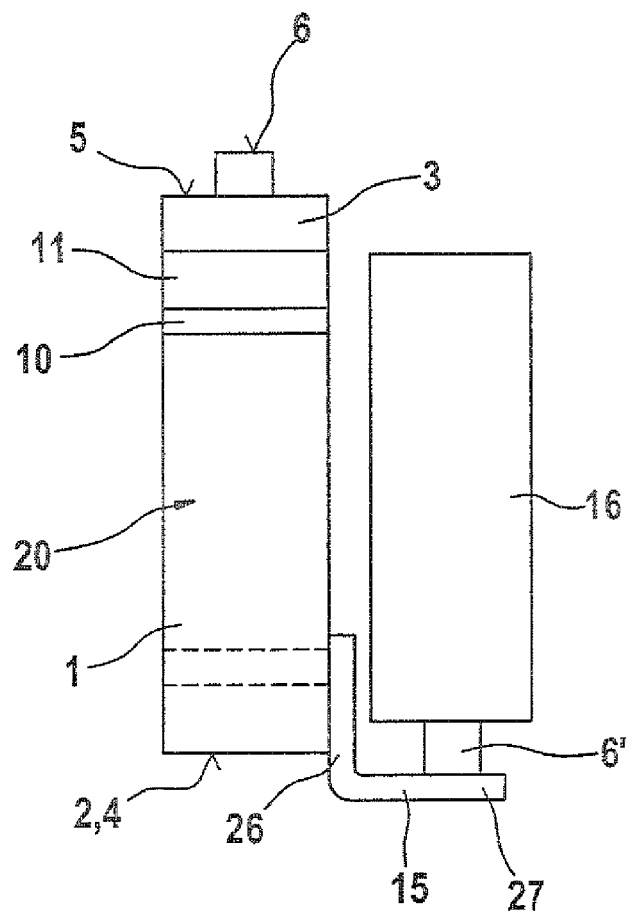
FIG. 5 is a plan view on the rechargeable battery of the invention with the PTC element in the installed state, which is connected via a cell connector to a second rechargeable battery without a PTC element.

As shown in FIG. 6, typical flat, plane cell connectors 24 connect the negative pole of a cell 16 to the positive pole 6' of the next, adjacent cell 16. For good, safe electrical connection of a cell 1 coated with the PTC element 20 to a cell 16 without a PTC element, an adapted cell connector 15 is provided, which as FIG. 5 especially shows, has an angled shape. A first leg 26 rests in the longitudinal direction on the cell 1 at the second layer 12, while conversely the second leg 27 rests on the positive pole or attachment point 6' of the next cell 16. The insulation layer 14 covered by the second layer 12 is indicated in FIG. 6.

For producing the cell connector 15, a typical flat cell connector 24 can for instance simply be bent at an angle. By means of the angled cell connector 15, it is possible without structural alteration to install or snap the rechargeable battery 1 of the invention into the battery pack 17; because of the insulation layer 14 superimposed on the first base 4 and because of the second layer 23, this battery pack is somewhat longer when compared to the first embodiment. To compensate for the somewhat longer structural length, the flat cell connector 24, which viewed in the longitudinal direction of the cell 1 is provided between two or more holders 25 for the cells 1, 16, is then dispensed with and simply replaced by the angled cell connector 15.

The foregoing relates to preferred exemplary embodiments of the invention, it being understood that other variants and embodiments thereof are possible within the spirit and scope of the invention, the latter being defined by the appended claims.

I claim:

1. A rechargeable battery, comprising:
   a cell received in a cell cup,
   wherein said cell has a positive pole and an elongated cylindrical shape with a jacket face,
   a temperature-dependent element which monitors the temperature of the cell, the temperature-dependent element at least partially surrounding the jacket face and the cell cup, and
   wherein the temperature-dependent element is a PTC element,
   said PTC element comprising:
   a first metal layer soldered and/or welded and/or glued on the cell cup, the first metal layer producing an electrical connection between the PTC element and the cell cup or cell, said first metal layer extending into a vicinity of the positive pole,
   a plastic intermediate layer adjoining the first metal layer, the intermediate layer having cold conductor properties, said plastic intermediate layer not extending as far toward the positive pole as the first metal layer, and
   a second metal layer covering the intermediate layer,
   wherein the PTC element is connected electrically to the cell cup such that a series circuit of the temperature-dependent element and the cell is effected, and
   wherein the second metal layer forms a new negative pole of the cell.

2. The rechargeable battery as defined by claim 1, wherein the temperature-dependent element surrounds the cell cup approximately halfway around the cell cup.

3. The rechargeable battery as defined by claim 1, further comprising an insulation layer for insulation purposes provided at least partially between the first metal layer and the second metal layer of the temperature-dependent element.

4. The rechargeable battery as defined by claim 1, further comprising an insulation layer for insulation purposes provided between the second metal layer and the cell cup.

5. The rechargeable battery as defined by claim 3, further comprising an insulation layer for insulation purposes provided between the second metal layer and the cell cup.

6. The rechargeable battery as defined by claim 3, wherein the insulation layer or layers comprise a film or foil.

7. The rechargeable battery as defined by claim 4, wherein the insulation layer or layers comprise a film or foil.

8. The rechargeable battery as defined by claim 5, wherein the insulation layer or layers comprise a film or foil.

9. A battery pack containing at least a single rechargeable battery constructed in accordance with claim 1.

10. The battery pack as defined by claim 9, wherein an adapted cell connector is provided for connecting the at least one rechargeable battery to a further, conventional rechargeable battery of the battery pack, the adapted cell connector having an angled shape.

11. A rechargeable battery, comprising:
    a cell received in a cell cup,
    wherein said cell has a first base, which forms a negative pole, a second base, which forms a positive pole, and an elongated cylindrical shape with a jacket face,
    a temperature-dependent element which monitors the temperature of the cell, the temperature-dependent element at least partially surrounding the jacket face and the cell cup, and
    wherein the temperature-dependent element is a PTC element,
    said PTC element comprising:
    a first metal layer soldered and/or welded and/or glued on the cell cup, the first metal layer producing an electrical connection between the PTC element and the cell cup or cell, said first metal layer extending into a vicinity of the positive pole,
    a plastic intermediate layer adjoining the first metal layer, the intermediate layer having cold conductor properties, said plastic intermediate layer not extending as far toward the positive pole as the first metal layer, and
    a second metal layer covering the intermediate layer and partially covering the first base,
    an insulation layer between the second metal layer and the first base,
    wherein the PTC element is connected electrically to the cell cup such that a series circuit of the temperature-dependent element and the cell is effected, and
    wherein the second metal layer forms a new negative pole of the cell and is insulated from the former negative pole by said insulation layer.

* * * * *